United States Patent
Arai et al.

(10) Patent No.: US 10,202,919 B2
(45) Date of Patent: Feb. 12, 2019

(54) ENGINE OUTPUT CONTROL DEVICE

(71) Applicant: HONDA MOTOR CO., LTD., Minato-Ku, Tokyo (JP)

(72) Inventors: Dai Arai, Wako (JP); Junya Niwa, Wako (JP); Masataka Tanaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/639,390

(22) Filed: Jun. 30, 2017

(65) Prior Publication Data

US 2018/0003117 A1    Jan. 4, 2018

(30) Foreign Application Priority Data

Jul. 4, 2016 (JP) .................. 2016-132238

(51) Int. Cl.
*F02D 41/02* (2006.01)
*B60W 10/06* (2006.01)
(Continued)

(52) U.S. Cl.
CPC ......... *F02D 41/0225* (2013.01); *B60W 10/06* (2013.01); *B60W 30/19* (2013.01);
(Continued)

(58) Field of Classification Search
CPC .. F02D 41/0225; F02D 41/023; F02D 41/107; F02D 41/30; F02D 2200/1004; F02D 2200/101; F02D 2200/501; F02D 2200/602; F02D 2200/1002; F02D 2250/26; B60W 10/06; F16H 63/502
(Continued)

(56) References Cited

U.S. PATENT DOCUMENTS

| | | | |
|---|---|---|---|
| 2005/0054482 A1* | 3/2005 | Doering | F02D 41/0215 477/107 |
| 2005/0148428 A1* | 7/2005 | Cullen | B60W 10/06 477/110 |
| 2006/0068975 A1 | 3/2006 | Kobayashi et al. | |
| 2010/0250094 A1* | 9/2010 | Tetsuka | F02D 9/02 701/103 |

FOREIGN PATENT DOCUMENTS

| EP | 2 980 387 A1 | 2/2016 |
|---|---|---|
| JP | S62-275848 A | 11/1987 |

(Continued)

OTHER PUBLICATIONS

Extended European search report dated Nov. 29, 2017, issued over the corresponding EP patent application 17 17 8638.7.

(Continued)

*Primary Examiner* — Mahmoud Gimie
(74) *Attorney, Agent, or Firm* — Carrier Blackman & Associates, P.C.; Joseph P. Carrier; Jeffrey T. Gedeon (57) ABSTRACT

An engine output control device controls engine output at a time of a downshift speed change of a transmission. The engine output control device includes: engine speed detecting means for detecting an actual engine speed NeJ of a crankshaft; and engine output adjusting means capable of adjusting the engine output according to an operation of a rider. The smaller of a requested engine output PA calculated on a basis of the actual engine speed NeJ and a rider requested engine output PB adjusted by the engine output adjusting means is output as the engine output.

10 Claims, 8 Drawing Sheets

(51) Int. Cl.
*F16H 63/50* (2006.01)
*B60W 30/19* (2012.01)
*F16H 61/04* (2006.01)
*F02D 41/10* (2006.01)
*F02D 41/30* (2006.01)
*F02D 37/02* (2006.01)

(52) U.S. Cl.
CPC ......... *F02D 41/023* (2013.01); *F16H 63/502* (2013.01); *F02D 37/02* (2013.01); *F02D 41/107* (2013.01); *F02D 41/30* (2013.01); *F02D 2200/101* (2013.01); *F02D 2200/1004* (2013.01); *F02D 2200/501* (2013.01); *F02D 2200/602* (2013.01); *F02D 2250/26* (2013.01); *F16H 2061/0474* (2013.01)

(58) Field of Classification Search
USPC ......................................................... 701/110
See application file for complete search history.

(56) References Cited

FOREIGN PATENT DOCUMENTS

| | | |
|---|---|---|
| JP | 2004-137907 A | 5/2004 |
| JP | 2006-112256 A | 4/2006 |
| JP | 2008-144756 A | 6/2008 |
| JP | 4392794 B2 | 1/2010 |
| JP | 2014-163342 A | 9/2014 |
| JP | 2016-020669 A | 2/2016 |

OTHER PUBLICATIONS

Office Action issued in the corresponding Japanese Patent Application No. 2016-132238, dated Jul. 3, 2018, and the English machine translation thereof.

* cited by examiner

ENGINE OUTPUT CONTROL DEVICE

The present application claims priority under 35 U.S.C. § 119 to Japanese Patent Application No. 2016-132238 filed on Jul. 4, 2016. The content of the application is incorporated herein by reference in its entirety.

TECHNICAL FIELD

The present invention relates to an engine output control device.

BACKGROUND ART

An engine output control device is conventionally known which reduces a speed change shock of a transmission by adjusting engine output (see for example Patent Document 1).

PRIOR ART DOCUMENT

Patent Document

[Patent Document 1]
Japanese Patent No. 4392794

SUMMARY OF THE INVENTION

Problems to be Solved by the Invention

In Patent Document 1, an engine output requested by a rider is not taken into consideration in relation to the engine output adjustment. Thus, more acceleration of a vehicle than is requested by the rider, a feeling of strangeness, and an excessive overshoot of engine speed may occur at a time of completion of a speed change.

It is an object of the present invention to provide an engine output control device that takes a rider requested engine output into consideration.

Means for Solving the Problems

In order to solve the above-described problems, according to an aspect of the present invention (first feature), there is provided an engine output control device for controlling engine output at a time of a downshift speed change of a transmission (37), the engine output control device including: engine speed detecting means (SE3) for detecting an actual engine speed (NeJ) of a crankshaft (33a); and engine output adjusting means (27) capable of adjusting the engine output according to an operation of a rider; the smaller of a requested engine output (PA) calculated on a basis of the actual engine speed (NeJ) and a rider requested engine output (PB) adjusted by the engine output adjusting means (27) being output as the engine output.

According to a second feature, the engine output control device may have a meshing portion (62b) formed in a projecting manner at one of a pair of speed change gears (61, 62) included in the transmission (37), be provided with a meshed portion (61b) into which the meshing portion (62b) is inserted at the other of the pair of speed change gears (61, 62), and output the smaller of the requested engine output (PA) and the rider requested engine output (PB) as the engine output until relative rotation between the meshing portion (62b) and the meshed portion (61b) in a state of the meshing portion (62b) being inserted in the meshed portion (61b) is ceased in a power transmitting direction between the pair of speed change gears (61, 62).

The above-described output limitation is started at a point in time that the actual engine speed (NeJ) has become close to a target engine speed (NeT) by a value set for the target engine speed (NeT) in advance, the target engine speed (NeT) being set with respect to an engine speed (NeB) after the speed change operation, the engine speed (NeB) after the speed change operation being calculated from a vehicle speed at the time of the speed change operation and the speed change ratio of a speed change stage after the downshift.

In addition, one of the pair of speed change gears included in the transmission has the meshing portion formed in a projecting manner and the other of the pair of speed change gears has the meshed portion into which the meshing portion is inserted, and the output limitation is continued until a point in time that the relative rotation between the meshing portion and the meshed portion is ceased and that torque transmission is therefore considered to be started at transmission surfaces on an acceleration side.

According to a third feature, the engine output control device may calculate an engine speed after speed change operation (NeB) from a vehicle speed at the time of the speed change operation and a speed change ratio of a speed change stage after a downshift. The engine output control device may further include subtractive engine output calculating means (54) for calculating a subtractive engine output (PC) to be subtracted from the rider requested engine output (PB) when the actual engine speed (NeJ) overshoots the engine speed after speed change operation (NeB) after the relative rotation between the meshing portion (62b) and the meshed portion (61b) is ceased and the speed change is completed. The subtractive engine output calculating means (54) may obtain the subtractive engine output (PC) from an overshoot amount (NeD) of the actual engine speed (NeJ).

The subtractive engine output calculating means (54) calculates the subtractive engine output (PC) when the actual engine speed (NeJ) overshoots the engine speed after speed change operation (NeB) at the point in time that torque transmission is considered to be started at the transmission surfaces on the acceleration side.

According to a fourth feature, the engine output control device may calculate an engine speed after speed change operation (NeB) from a vehicle speed at the time of the speed change operation and a speed change ratio of a speed change stage after a downshift, and output the requested engine output (PA) until the actual engine speed (NeJ) reaches a predetermined engine speed (NeS) determined on a basis of the engine speed after speed change operation (NeB).

The target engine speed (NeT) set with respect to the engine speed after speed change operation (NeB) is calculated, and the requested engine output (PA) is output until the actual engine speed (NeJ) reaches a predetermined engine speed (NeS) (=Engine Speed After Speed Change Operation (NeB)−Predetermined Value (β)) which is close to the target engine speed (NeT) by a preset predetermined value (β).

According to a fifth feature, the engine output control device may calculate a target engine speed (NeT) from a vehicle speed at the time of the speed change operation and a speed change ratio of a speed change stage after a downshift, determine the requested engine output (PA) according to a difference between the target engine speed (NeT) and the actual engine speed (NeJ), and output the determined requested engine output (PA).

Effects of the Invention

According to the first feature of the aspect of the present invention, the engine output output at the time of a speed change operation is limited to the rider requested engine output or less. A vehicle body is thereby prevented from accelerating more than requested by the rider at a point in time that the speed change is completed and that the vehicle body is set in an accelerating state. It is thus possible to alleviate a feeling of strangeness during the speed change operation, and possible to suppress an excessive overshoot of the engine speed.

According to the second feature, the output limitation is started after the engine speed becomes close to the target rotational speed by a value set in advance. Thus, rotation can be increased quickly in an initial stage of the speed change. A time necessary for the speed change can therefore be shortened. In addition, by continuing the output limitation until a point in time that torque transmission to the acceleration side is considered to be started, it is possible to suppress an excessive overshoot of the engine speed, and possible to alleviate a speed change shock when power transmission between the pair of speed change gears is started.

According to the third feature, a smooth acceleration after the shift change can be realized by subtracting an excessive torque occurring in timing in which the meshing portion and the meshed portion collide with each other on the acceleration side from the rider requested engine output when the engine speed overshoots.

According to the fourth feature and the fifth feature, the engine speed can be increased quickly at the time of the speed change operation.

MODE FOR CARRYING OUT THE INVENTION

An embodiment of the present invention will hereinafter be described with reference to the drawings.

Figure 1:
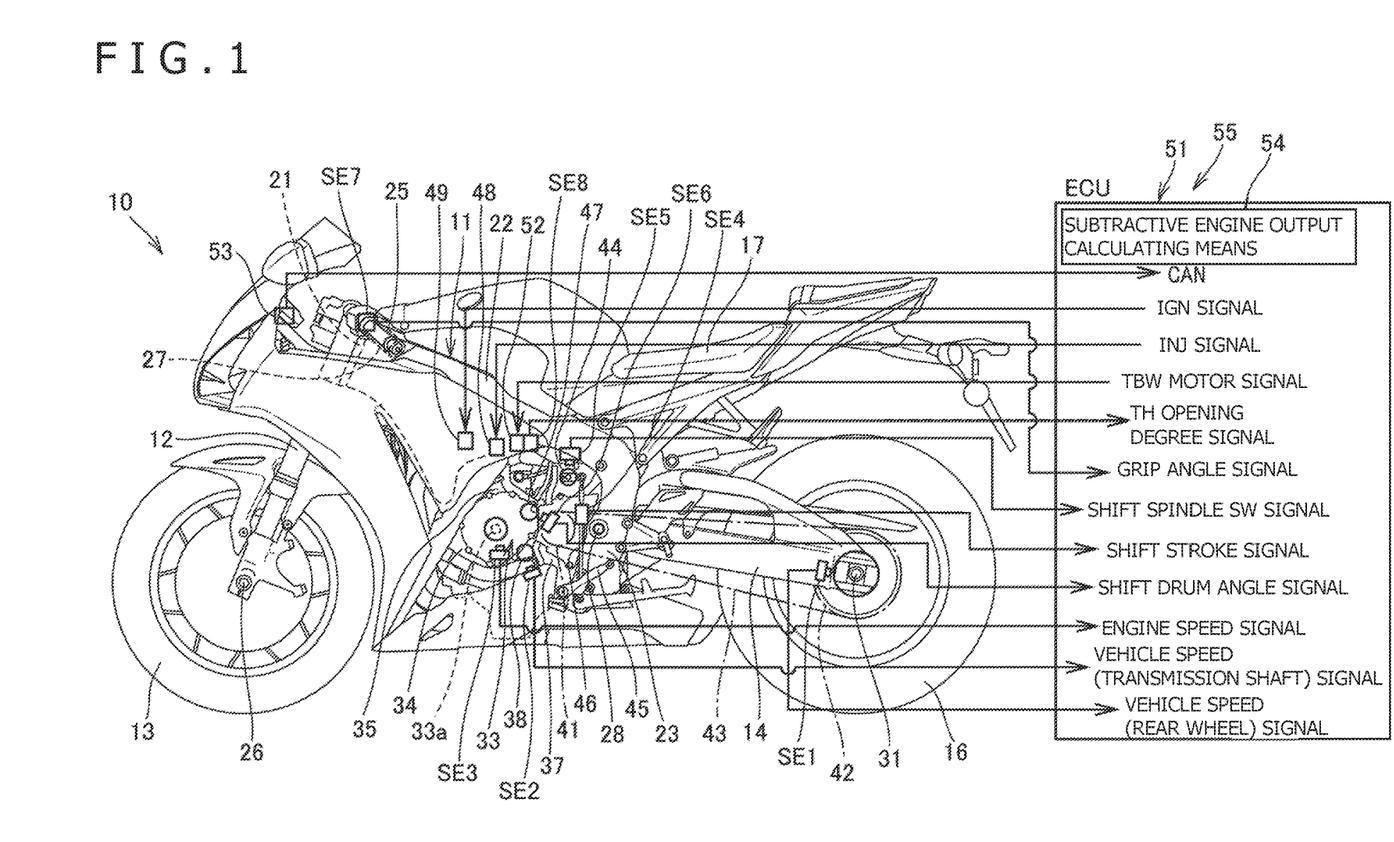
FIG. 1 is a left side view of a motorcycle including an engine output control device according to the present invention.

FIG. 1 is a left side view of a motorcycle 10 including an engine output control device according to the present invention.

The motorcycle 10 is a saddle riding type vehicle having a front wheel 13 supported by a front end portion of a vehicle body frame 11 via a front fork 12, having a rear wheel 16 supported by a lower portion of the vehicle body frame 11 via a swing arm 14, and having a seat 17 on an upper portion of the vehicle body frame 11.

The vehicle body frame 11 includes: a head pipe 21 that constitutes the front end portion of the vehicle body frame 11; a pair of left and right main frames 22 that extend rearward and obliquely downward from the head pipe 21; and a pair of left and right pivot frames 23 that extend downward from rear ends of the left and right main frames 22.

The front fork 12 is steerably supported by the head pipe 21. A bar handle 25 is attached to an upper end portion of the front fork 12. A lower end portion of the front fork 12 supports the front wheel 13 via an axle 26. A throttle grip 27 (engine output adjusting means) is rotatably provided to one end portion (for example a right end portion) of the bar handle 25. A throttle valve to be described later is opened and closed as the throttle grip 27 is rotated.

A front end portion of the swing arm 14 is vertically swingably supported by a pivot shaft 28 provided to the left and right pivot frames 23. A rear end portion of the swing arm 14 supports the rear wheel 16 via an axle 31.

A front portion of the vehicle body frame 11 and the left and right pivot frames 23 support an engine 33. The engine 33 includes: a crankcase 34 that houses a crankshaft 33a; and a cylinder portion 35 raised from a front portion of the crankcase 34. A transmission 37 is provided in the rear of the crankcase 34. The cylinder portion 35 includes a combustion chamber. A rear portion of the cylinder portion 35 is provided with an intake device that supplies fuel and air into the combustion chamber. A front portion of the cylinder portion 35 is provided with an exhaust device that discharges exhaust from the combustion chamber. In addition, a side surface of the cylinder portion 35 is provided with a spark plug 49 whose end portion faces the combustion chamber.

The intake device includes: a throttle body including a throttle valve that opens and closes an air passage; and a fuel injection valve that supplies fuel to the combustion chamber. The throttle valve is opened and closed by an electric motor for throttle by wire (TBW). The electric motor for TBW is driven on the basis of a rotational angle signal output from a grip angle sensor SE7 that detects the rotational angle of the throttle grip 27. The throttle valve is therefore opened and closed according to the rotation of the throttle grip 27.

A drive sprocket 41 is attached to an output shaft of the transmission 37. A chain 43 is stretched between the drive sprocket 41 and a driven sprocket 42 attached to the rear wheel 16. Power is thus transmitted from the transmission 37 to the rear wheel 16.

The transmission 37 includes a gear change pedal 45, an operating force transmitting mechanism 46, a shift spindle 44, and a shift drum 47.

The gear change pedal 45 is operated for speed change by a rider. The operating force transmitting mechanism 46 is coupled to the gear change pedal 45 to transmit an operating force applied to the gear change pedal 45 to the shift spindle 44. The shift drum 47 is rotated by the operating force transmitted from the shift spindle 44 side, and thereby moves a plurality of speed change gears included in the transmission 37 via shift forks (not depicted), thus changing a speed change stage.

The speed (vehicle speed) of the motorcycle 10 is determined on the basis of signals output from a rear wheel rotation sensor SE1 detecting the rotational speed of the rear wheel 16 and a transmission shaft rotation sensor SE2 detecting the rotational speed of a transmission shaft 38 (a main shaft, a counter shaft, or the like) of the transmission 37.

The rotational speed of the crankshaft 33a of the engine 33 (actual engine speed NeJ) is detected by a crankshaft sensor (engine speed detecting means) SE3 provided to the crankcase 34.

In the transmission 37, the operation of the operating force transmitting mechanism 46 is detected by a shift stroke sensor SE4, the rotation of the shift spindle 44 is detected by a shift spindle switch SE5, and the angle of rotation of the shift drum 47 is detected by a shift drum position sensor SE6.

The rotational angle of the throttle grip 27 (throttle grip angle) is detected by the grip angle sensor SE7. The degree of opening of the throttle valve (degree of throttle opening) is detected by a throttle opening degree sensor SE8. Incidentally, an operation of rotating the throttle grip 27 is electrically transmitted to the throttle valve via a conductor. The above-described degree of throttle opening is in proportion to the throttle grip angle. However, the degree of throttle opening may be increased according to increases in the throttle grip angle, though not in proportional relation to the throttle grip angle.

Respective signals from the sensors SE1, SE2, SE3, SE4, SE6, SE7, and SE8 and the switch SE5 described above are input to an electronic control unit (ECU) 51. In addition, the ECU 51 outputs an INJ signal to an fuel injection valve 48 to make fuel injected from the fuel injection valve 48, outputs an IGN signal to the spark plug 49 to make the spark plug 49 ignite, and outputs a TBW motor signal to an electric motor 52 for TBW to actuate the electric motor 52 for TBW. In addition, the ECU 51 is connected to a meter 53 disposed on an upper front portion of the vehicle body by a controller area network (CAN).

The ECU 51, the sensors SE1, SE2, SE3, SE4, SE6, SE7, and SE8, and the switch SE5 described above constitute an engine output control device 55.

The ECU 51 includes subtractive engine output calculating means 54 for calculating a subtractive engine output to be subtracted from a rider requested engine output, the rider requested engine output being set on the basis of the rotational angle of the throttle grip 27 and engine speed. The subtractive engine output will be described later in detail.

Figure 2A:
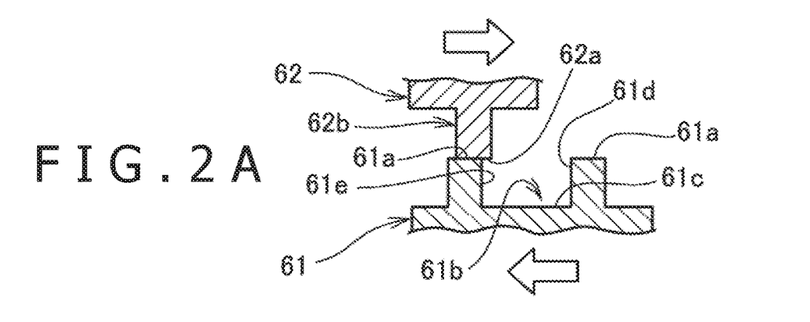
FIGS. 2A, 2B, 2C, and 2D are schematic diagrams depicting the structure and action of a pair of speed change gears included in a transmission, FIG. 2A being a diagram depicting a state before a dowel and a dowel hole mesh with each other, FIG. 2B being a diagram depicting a half meshing state of the dowel and the dowel hole, FIG. 2C being a diagram depicting a state in which the dowel is fully inserted in the dowel hole, and FIG. 2D being a diagram depicting a state in which relative rotation between the dowel and the dowel hole is ceased.
Figure 2B:
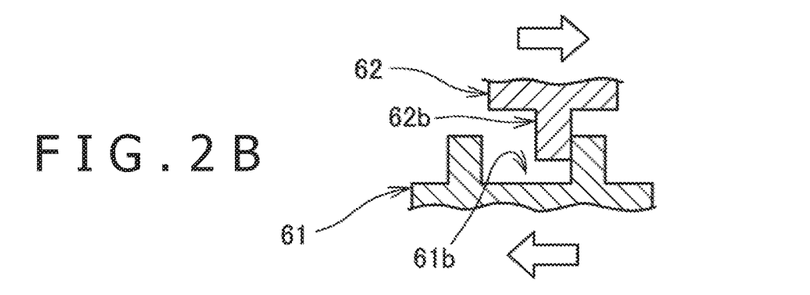
Figure 2C:
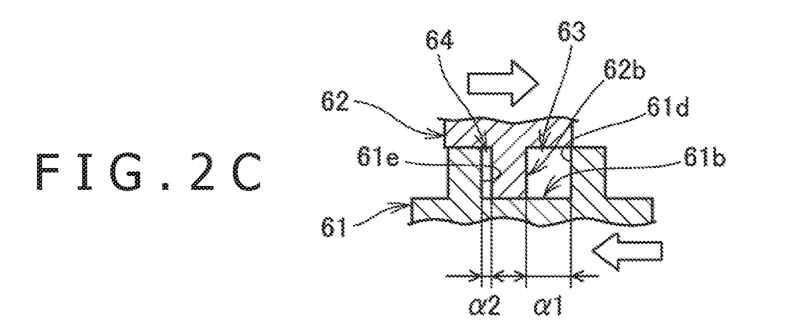
Figure 2D:
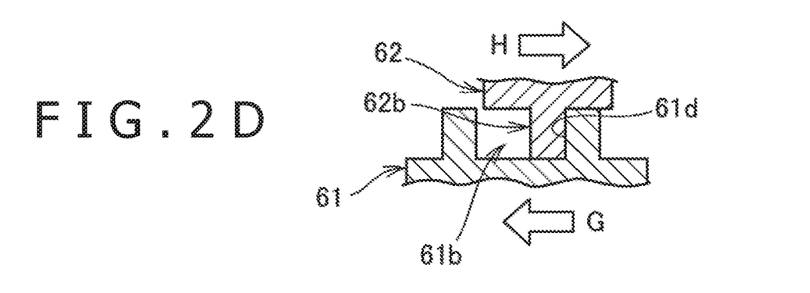

FIGS. 2A, 2B, 2C, and 2D are schematic diagrams depicting the structure and action of a pair of speed change gears 61 and 62 included in the transmission 37. FIGS. 2A to 2D depict a section obtained by circumferentially sectioning and developing a dowel 62b and a dowel hole 61b of the pair of speed change gears 61 and 62. FIG. 2A is a diagram depicting a state before the dowel 62b and the dowel hole 61b mesh with each other. FIG. 2B is a diagram depicting a half meshing state of the dowel 62b and the dowel hole 61b. FIG. 2C is a diagram depicting a state in which the dowel 62b is fully inserted in the dowel hole 61b. FIG. 2D is a diagram depicting a state in which relative rotation between the dowel 62b and the dowel hole 61b is ceased. Arrows in the figures indicate respective rotational directions of the pair of speed change gears 61 and 62.

As depicted in FIG. 2A, the pair of speed change gears 61 and 62 is disposed on the main shaft or the counter shaft included in the transmission 37. One speed change gear 61 is supported so as to be rotatable integrally with (or rotatable relative to) the main shaft or the counter shaft while the movement of the one speed change gear 61 in the axial direction of the main shaft or the counter shaft (vertical direction in the figure) is regulated. The speed change gear 61 has a dowel hole (meshed portion) 61b formed in an end surface 61a. The dowel hole 61b has a bottom surface 61c and side surfaces 61d and 61e raised from the bottom surface 61c and opposed to each other. The side surfaces 61d and 61e are formed so as to be separated from each other in the rotational direction of the speed change gear 61.

The other speed change gear 62 is supported so as to be rotatable integrally with (or rotatable relative to) the main shaft or the counter shaft while the speed change gear 62 is made movable in the axial direction of the main shaft or the counter shaft (vertical direction in the figure). The speed change gear 62 has a projecting-shaped dowel (meshing portion) 62b that can be inserted into the dowel hole 61b of the speed change gear 61.

When the speed change gear 62 is pressed to the speed change gear 61 side along the main shaft or the counter shaft by a speed change operation of the rider, an end surface 62a of the speed change gear 62 abuts against the end surface 61a of the speed change gear 61 at first, and then a relative rotation between the speed change gear 61 and the speed change gear 62 causes a half meshing state in which an end portion of the dowel 62b of the speed change gear 62 is inserted in the dowel hole 61b as depicted in FIG. 2B.

When the speed change gear 62 is further moved in the axial direction, the dowel 62b is fully inserted into the dowel hole 61b, as depicted in FIG. 2C. That is, the dowel 62b and the dowel hole 61b are in mesh with each other. Here, letting $\alpha 1$ and $\alpha 2$ be respective circumferential angles of gaps 63 and 64 between the dowel 62b and the side surfaces 61d and 61e of the dowel hole 61b, a circumferential play angle $\alpha$ of the dowel 62b within the dowel hole 61b is $\alpha = \alpha 1 + \alpha 2$.

Then, as depicted in FIG. 2D, power transmission of the speed change gear 61 in the direction of an arrow G or power transmission of the speed change gear 62 in the direction of an arrow H causes a state in which the dowel 62b abuts against one side surface 61d of the dowel hole 61b. As a result, power is transmitted from the speed change gear 61 to the speed change gear 62 or from the speed change gear 62 to the speed change gear 61. In this state, the angle $\alpha 1$ (see FIG. 2C) is zero, that is, relative rotation between the dowel 62b and the dowel hole 61b is eliminated by the power transmission.

Then, at a time of a next speed change operation (at a time of an upshift or at a time of a downshift), the dowel 62b is removed from the dowel hole 61b. That is, the meshing between the dowel 62b and the dowel hole 61b is released.

In the present embodiment, at a time of a speed change operation (at least at a time of a downshift), separately from the pair of speed change gears 61 and 62 described above, another pair of speed change gears 61A and 62A (not depicted) having a same basic structure as the speed change gears 61 and 62 also substantially simultaneously performs meshing and releasing of the meshing between a dowel 62b and a dowel hole 61b similar to those of the above-described speed change gears 61 and 62.

When the dowel 62b and the dowel hole 61b of one pair of speed change gears 61 and 62 mesh with each other, meshing between the dowel 62b and the dowel hole 61b of the other pair of speed change gears 61A and 62A is released in substantially the same timing as the meshing between the dowel 62b and the dowel hole 61b of the one pair of speed change gears 61 and 62, so that a speed change by one speed change stage (for example from third gear to second gear, from fourth gear to third gear, or the like) is completed. In addition, when meshing between the dowel 62b and the dowel hole 61b of the one pair of speed change gears 61 and 62 is released, the dowel 62b and the dowel hole 61b of the other pair of speed change gears 61A and 62A mesh with each other in substantially the same timing as the releasing of the meshing between the dowel 62b and the dowel hole 61b of the one pair of speed change gears 61 and 62, so that a speed change by one speed change stage is completed.

In the following, the other pair of speed change gears will also be described as speed change gears 61 and 62.

Figure 3:
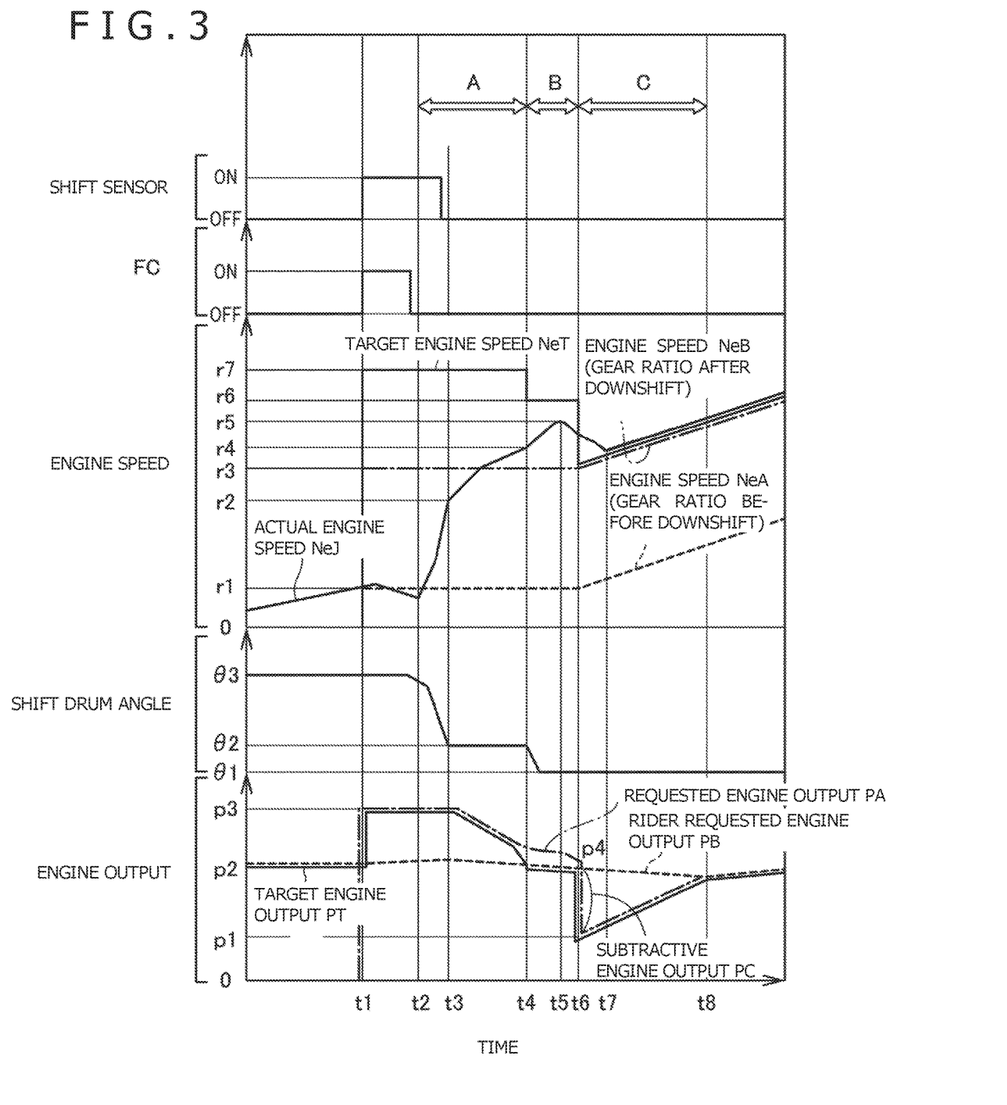
FIG. 3 is a graph depicting temporal changes in various variables at a time of a downshift in the transmission.

FIG. 3 is a graph depicting temporal changes in various variables at a time of a downshift in the transmission 37. An axis of ordinates of the graph indicates engine output, a shift drum angle, engine speed, a fuel cut (FC) state, and the on-off state of the shift sensor. An axis of abscissas of the graph indicates time. (Incidentally, see FIG. 1 and FIGS. 2A to 2D for reference symbols in the following description.)

In an accelerating state during traveling of the vehicle before time t1, the actual engine speed NeJ detected by the crankshaft sensor SE3 gradually increases. The actual engine speed NeJ at time t1 is r1.

When the rider performs a downshift operation (for example changes the speed change stage from third gear to second gear or the like) by the gear change pedal 45 at time t1, the shift stroke sensor SE4 is changed from an OFF state to an ON state.

When the shift stroke sensor SE4 is turned ON, the INJ (fuel injection) signal to the fuel injection valve 48 is stopped, and thus fuel injection from the fuel injection valve 48 is stopped. That is, the fuel cut state is changed from an OFF state to an ON state, so that a fuel cut is performed. As a result, torque transmission between the pair of speed change gears 61 and 62 within the transmission 37 is stopped, which loosens engagement between the dowel 62b connecting the pair of speed change gears 61 and 62 to each other and the dowel hole 61b. This makes it easier for the dowel 62b to come off the dowel hole 61b. At this time, the dowel 62b for connecting the other pair of speed change gears 61 and 62 to each other and the dowel hole 61b are in a state before engagement. The actual engine speed NeJ gradually falls from immediately after time t1 due to the fuel cut.

Incidentally, instead of the fuel cut described above, ignition timing may be retarded.

In the part of the engine speed in the graph, a broken line indicates engine speed NeA calculated from a vehicle speed at a time of a speed change operation and the gear ratio of a speed change stage before the downshift. In addition, in the part of the engine speed in the graph, alternate long and short dashed lines indicate engine speed (engine speed after the speed change operation) NeB determined from the vehicle speed at the time of the speed change operation and the gear ratio of a speed change stage after the downshift by one stage.

From time t1 to time t6, the engine speed NeA is r1, and the engine speed NeB is r3. After time t6, the engine speed NeA and the engine speed NeB increase gradually.

From time t1 to time t4, a target engine speed NeT (NeT1) is set at r7. This target engine speed NeT is calculated in consideration of the vehicle speed at the time of the speed change operation (time t1) and the gear ratio of the speed change stage after the downshift. The target engine speed NeT is set at a value higher than the engine speed NeB (engine speed indicated by the alternate long and short dashed lines)=r3 calculated from the vehicle speed at the time of the speed change operation (time t1) and the gear ratio of the speed change stage after the downshift.

As for the engine output, a target engine output PT as a target of the output is the same as a rider requested engine output PB, that is, p2 until time t1. At time t1, the target engine output PT and a requested engine output PA are the same, and increase from p2 to p3.

As will be described later in detail, the requested engine output PA is determined using the target engine speed NeT and the actual engine speed NeJ or the like.

Immediately before time t2, the fuel cut is changed from the ON state to the OFF state. In addition, near time t2, the shift drum 47 starts to rotate from a shift drum angle of θ3, and the dowel 62b connecting the pair of speed change gears 61 and 62 to each other and the dowel hole 61b start to be unmeshed from each other. In addition, because fuel injection from the fuel injection valve 48 is started immediately before time t2, the actual engine speed NeJ increases sharply from time t2 to time t3. At time t3, the actual engine speed NeJ is r2.

In a period from time t2 to time t4, the ECU 51 calculates a difference Ra (=Ra1) between the target engine speed NeT (=NeT1) and the actual engine speed NeJ, and determines the requested engine output PA from the difference Ra on the basis of relation between the difference Ra and the requested engine output PA (see FIG. 4), which relation is obtained in advance.

At time t3, the shift drum angle of the shift drum 47 becomes θ2, and the dowel 62b connecting the pair of speed change gears 61 and 62 to each other completely comes off the dowel hole 61b.

The target engine output PT from time t1 to time t3 is the same value as the requested engine output PA and is substantially fixed. In a period from time t3 to time t4, an increase in the actual engine speed NeJ reduces the difference Ra (=Ra1) between the target engine speed NeT (=NeT1) and the actual engine speed NeJ. Therefore, from the relation between the requested engine output PA and the difference Ra (see FIG. 4), the requested engine output PA is decreased gradually. Also during this period, the target engine output PT changes so as to have the same value as the requested engine output PA.

At time t4, the actual engine speed NeJ has approached the target engine speed NeT by a preset value, and therefore the target engine speed NeT is decreased from r7 to r6 (=NeT2). In addition, around time t4, the shift drum 47 starts to rotate from the shift drum angle θ2. The shift drum 47 thereafter rotates to the shift drum angle θ1, so that the dowel 62b connecting the other pair of speed change gears 61 and 62 to each other is inserted into the dowel hole 61b.

From time t4 to time t6, the smaller rider requested engine output PB of the requested engine output PA and the rider requested engine output PB is output as the target engine output PT. That is, the target engine output PT is the rider requested engine output PB.

The actual engine speed NeJ becomes r5 (maximum value) at time t5, and gradually decreases after time t5.

At time t6, the target engine speed NeT is decreased from r6 to r3, and becomes equal to the engine speed NeB. After time t6, the target engine speed NeT and the engine speed NeB gradually increase while having the same value.

In addition, at time t6, an output (PB−PC) obtained by subtracting a predetermined engine output PC from the rider requested engine output PB, which is determined from the degree of grip opening of the rider, is set as an initial value of the target engine output PT. That is, at time t6, the target engine output PT is p1, and the rider requested engine output PB is p4.

The target engine output PT is thereafter gradually returned to the rider requested engine output PB until time t8. The predetermined engine output PC subtracted from the rider requested engine output PB described above will be referred to as a subtractive engine output PC. From the above, an initial value of the subtractive engine output PC is PC=p4−p1.

The above-described subtractive engine output PC is set to decrease the target engine output PT for the following reasons.

At time t6, when relative rotation due to power transmission between the dowel 62b connecting the other pair of speed change gears 61 and 62 to each other and the dowel hole 61b is ceased, an abrupt torque transmission may occur between the other pair of speed change gears 61 and 62. This abrupt torque transmission occurs when rotational inertial energy of the engine is released to the vehicle body in a process in which the actual engine speed NeJ in an overshoot state sharply comes into synchronism with the engine speed NeB after the speed change operation (after the downshift). The above-described subtractive engine output PC is set to cancel this abrupt increase in torque and start torque transmission smoothly.

Time t6 is timing in which the relative rotation due to the power transmission between the dowel 62b and the dowel hole 61b is ceased, and can therefore be said to be a time at which the downshift is completed (completion of the speed change).

At time t7, an excessive overshoot has been suppressed since time t6, and the actual engine speed NeJ that has somewhat exceeded the target engine speed NeT becomes the same as the engine speed NeB. The actual engine speed NeJ thereafter increases gradually while remaining the same as the target engine speed NeT and the engine speed NeB.

In a time period A from time t2 to time t4 described above, the actual engine speed NeJ reaches the engine speed NeB.

In addition, in a time period B from time t4 to time t6, relative rotation between the dowel 62b and the dowel hole 61b of the other pair of speed change gears 61 and 62 is ceased after the actual engine speed NeJ reaches the engine speed NeB.

In addition, in a time period C from time t6 to time t8, the target engine output PT is once decreased by the subtractive engine output PC and then gradually increases until the target engine output PT becomes the same as the rider requested engine output PB after the relative rotation between the dowel 62b and the dowel hole 61b of the other pair of speed change gears 61 and 62 is ceased.

Figure 4:
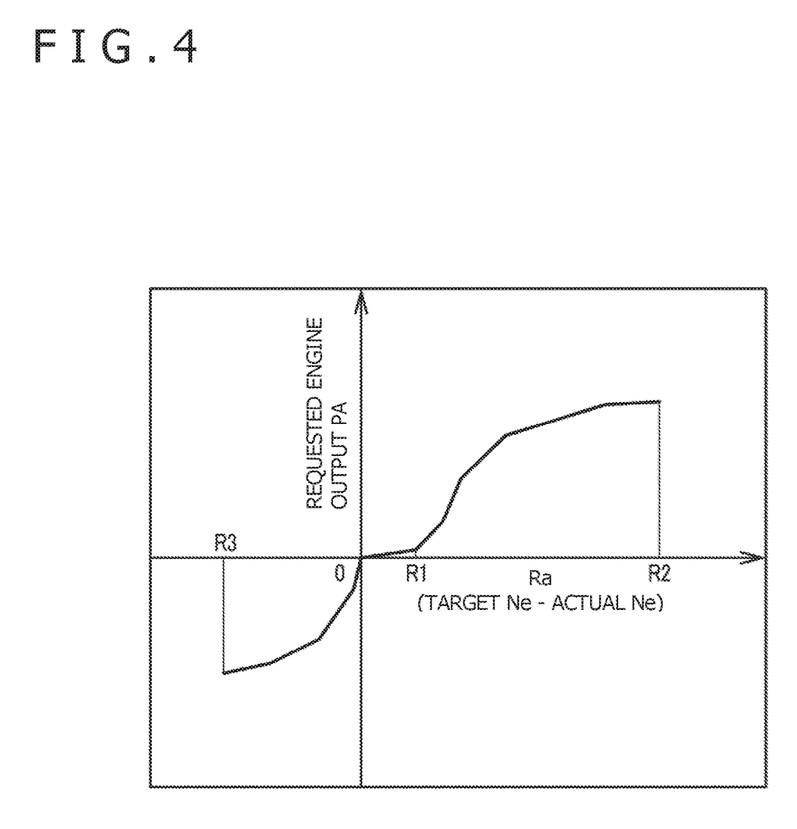
FIG. 4 is a graph depicting relation between a requested engine output and a value obtained by subtracting an actual engine speed from a target engine speed.

FIG. 4 is a graph depicting relation between the requested engine output PA and the difference Ra obtained by subtracting the actual engine speed NeJ from the target engine speed NeT. An axis of ordinates of the graph indicates the requested engine output PA. An axis of abscissas of the graph indicates the difference Ra (=Target Engine Speed NeT (Target Ne)−Actual Engine Speed NeJ (Actual Ne)).

The requested engine output PA gradually increases substantially linearly when the difference Ra (=NeT−NeJ) between the target engine speed NeT and the actual engine speed NeJ is a positive value and the difference Ra is in a range of zero to a difference R1. When the difference Ra is in a range of the difference R1 to a difference R2, the requested engine output PA increases with a steep slope immediately after the difference R1 is exceeded. However, the slope of the increase of the requested engine output PA gradually decreases as the difference Ra approaches the difference R2.

In a case where the difference Ra is a negative value and the difference Ra is in a range of zero to a difference R3, the requested engine output PA decreases with a steep slope when the difference Ra is close to zero. The slope of the decrease of the requested engine output PA gradually decreases as the difference Ra approaches the difference R3.

The above-described relation between the requested engine output PA and the difference Ra is obtained from experiment, calculation, experience, and the like, and is stored in a storage device (not depicted) provided within the ECU 51 (see FIG. 1) in advance.

Figure 5:
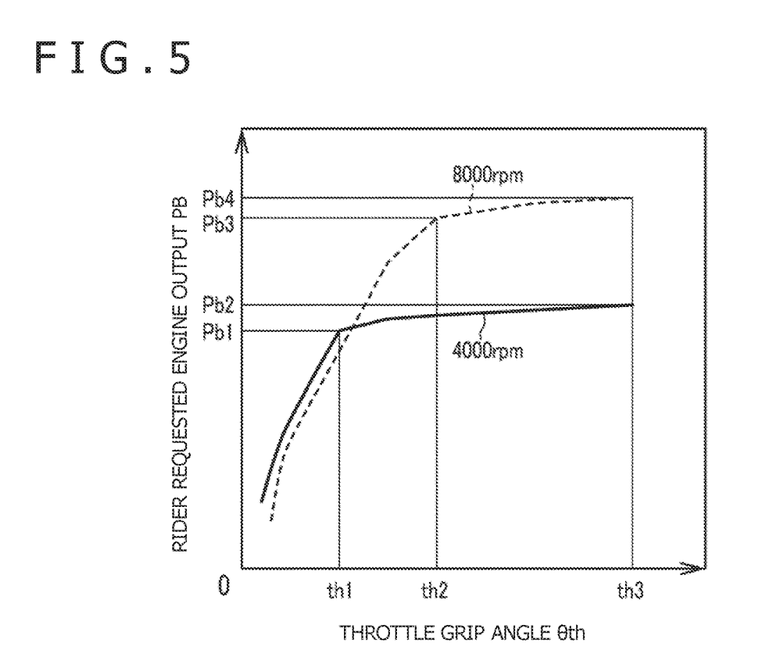
FIG. 5 is a graph depicting relation between a rider requested engine output and a throttle grip angle.

FIG. 5 is a graph depicting relation between the rider requested engine output PB and a throttle grip angle θth. An axis of ordinates of the graph indicates the rider requested engine output PB. An axis of abscissas of the graph indicates the throttle grip angle θth.

As the rider performs an operation of rotating the throttle grip 27 (see FIG. 1), the throttle grip angle θth is changed, the throttle valve is opened or closed, and the degree of throttle opening is changed.

The relation between the rider requested engine output PB and the throttle grip angle θth is set at each of a plurality of actual engine speeds.

For example, at an actual engine speed of 4000 rpm indicated by a solid line, from a state of the throttle valve being closed (throttle grip angle θth=0) to the throttle grip angle θth=th1, the rider requested engine output PB sharply increases in a range up to Pb1. Further, when the throttle grip angle θth is in a range of th1 to th3, the rider requested engine output PB gently increases from Pb1 to Pb2.

In addition, for example, at an actual engine speed of 8000 rpm indicated by a broken line, from the state of the throttle valve being closed to the throttle grip angle θth=th2, the rider requested engine output PB sharply increases in a range up to Pb3. Further, when the throttle grip angle θth is in a range of th2 to th3, the rider requested engine output PB gently increases from Pb3 to Pb4. Also at other actual engine speeds, the rider requested engine output PB changes with tendencies substantially similar to the tendencies at 4000 rpm and 8000 rpm as described above with respect to the throttle grip angle θth.

The above-described relation between the rider requested engine output PB and the throttle grip angle θth is obtained from experiment, calculation, experience, and the like, and is stored in the storage device (not depicted) disposed within the ECU 51 (see FIG. 1) in advance.

Figure 6:
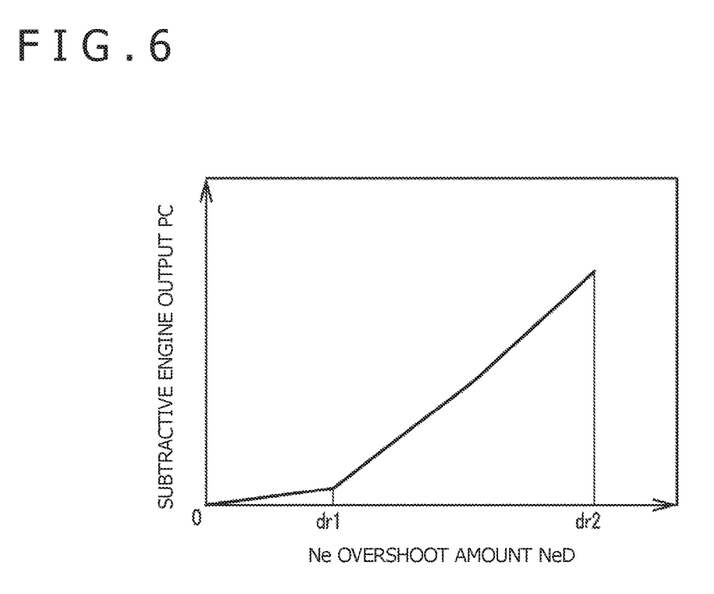
FIG. 6 is a graph depicting relation between a subtractive engine output and an engine speed overshoot amount.

FIG. 6 is a graph depicting relation between the subtractive engine output PC and an engine speed overshoot amount Ned. An axis of ordinates of the graph indicates the subtractive engine output PC. An axis of abscissas of the graph indicates the engine speed overshoot amount Ned.

When the engine speed overshoot amount (Ne overshoot amount) Ned is in a range of zero to dr1, the subtractive engine output PC gradually increases substantially linearly. Further, when the engine speed overshoot amount Ned is in a range of dr1 to dr2, the subtractive engine output PC gradually increases substantially linearly with a steeper slope of increase than when the engine speed overshoot amount Ned is in the range of zero to dr1. The subtractive engine output PC is zero when there is no engine speed overshoot amount Ned.

Thus, the larger the engine speed overshoot amount Ned, the larger the subtractive engine output PC. It is thereby possible to cancel excess torque that increases as the overshoot amount increases, and thus suppress a speed change shock.

The above-described relation between the subtractive engine output PC and the engine speed overshoot amount Ned is obtained from experiment, calculation, experience, and the like, and is stored in the storage device (not depicted) disposed within the ECU (see FIG. 1) in advance.

Figure 7:
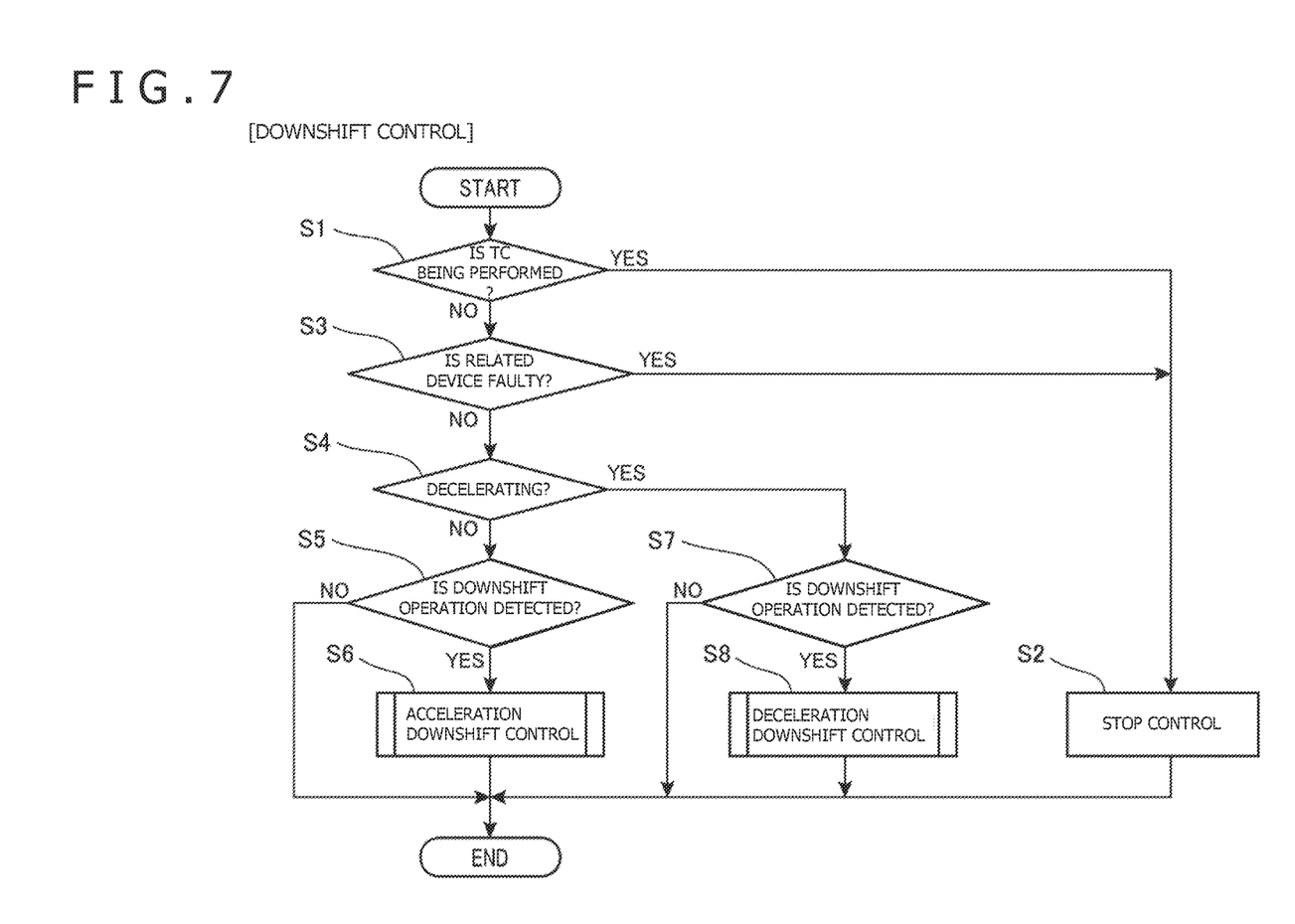
FIG. 7 is a flowchart depicting downshift control of the transmission.

FIG. 7 is a flowchart depicting downshift control of the transmission 37. (Incidentally, see FIG. 1 for reference symbols in the following description).

The ECU 51 determines whether traction control (TC) is performed in a driving system including the engine 33 and the transmission 37 (step S1).

When TC is performed (YES in step S1), the downshift control is stopped (step S2).

When TC is not performed (NO in step S1), the ECU 51 determines whether a speed change-related device of the engine 33 and the transmission 37 (device including each configuration of the engine output control device 55) is faulty (step S3).

When the speed change-related device is faulty (YES in step S3), the downshift control is stopped (step S2).

When the speed change-related device is not faulty (NO in step S3), the ECU 51 determines whether the vehicle is decelerating (step S4).

When the vehicle is not decelerating (NO in step S4), the ECU 51 determines whether a downshift operation by the rider is detected by the shift stroke sensor SE4 (stroke detection by the shift stroke sensor SE4) (step S5).

When a downshift operation is detected (YES in step S5), the ECU 51 performs acceleration downshift control (step S6).

When no downshift operation is detected (NO in step S5), the processing is ended.

When the vehicle is decelerating in step S4 (YES), the ECU 51 determines whether a downshift operation is detected (stroke detection by the shift stroke sensor SE4) (step S7).

When a downshift operation is detected (YES in step S7), the ECU 51 performs deceleration downshift control (step S8). When no downshift operation is detected (NO in step S7), the processing is ended.

The above-described acceleration downshift control of the transmission 37 is specifically engine output control when a downshift is performed at a time of acceleration of the vehicle.

Figure 8:
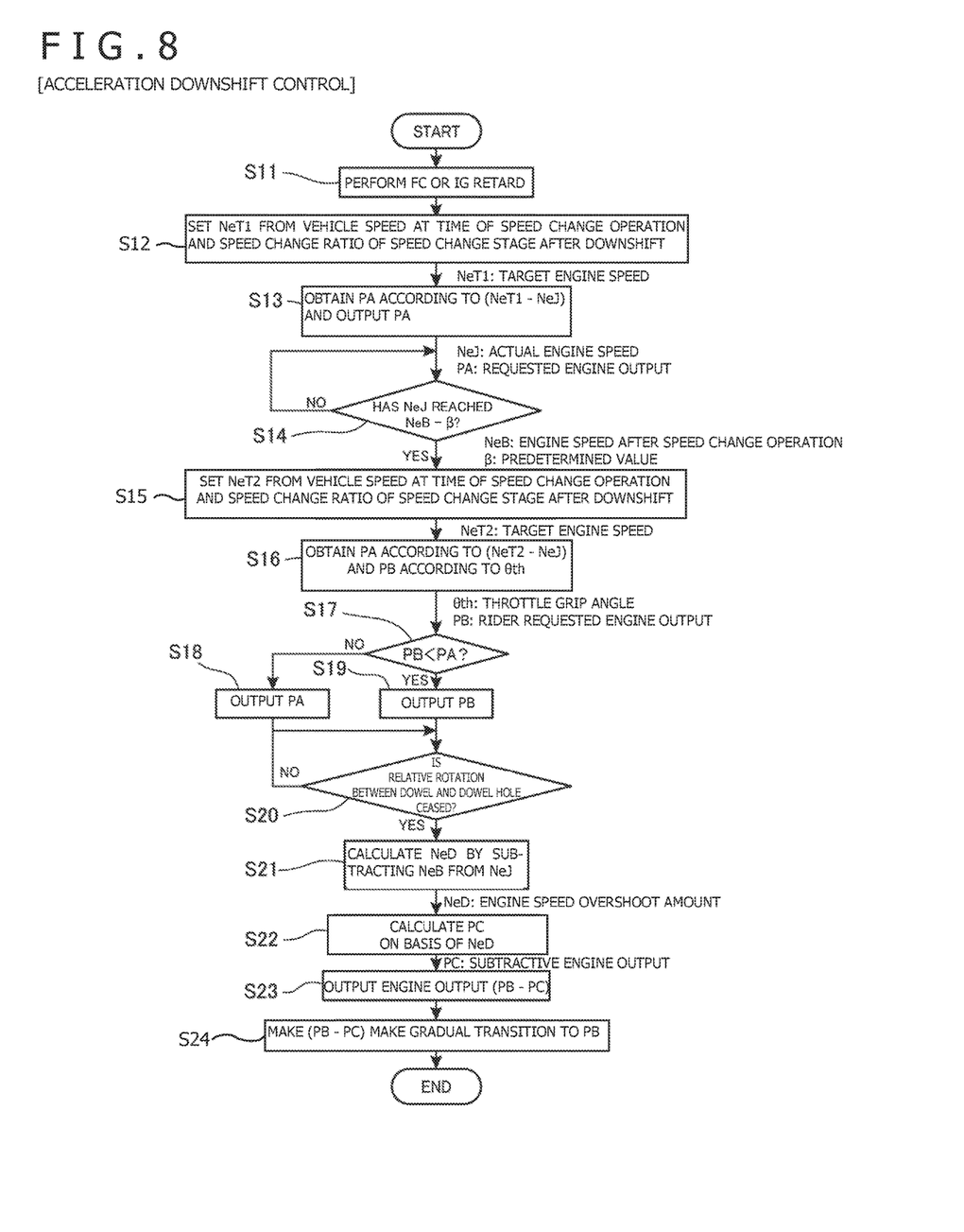
FIG. 8 is a flowchart depicting acceleration downshift control of the transmission.

FIG. 8 is a flowchart depicting the acceleration downshift control of the transmission. (Incidentally, see FIG. 1 and FIGS. 2A to 2D for reference symbols in the following description.)

After the downshift operation is detected in step S5 in the downshift control depicted in FIG. 7, the ECU 51 performs a fuel cut (FC) or retards ignition timing (IG retard), as depicted in FIG. 8 (step S11). As a result, the engine 33 is set in a decelerating state, and a transmitted torque acting between the pair of speed change gears 61 and 62 is decreased. Meshing between the dowel 62b and the dowel hole 61b is therefore loosened.

Next, the ECU 51 sets the target engine speed NeT (=NeT1) from a vehicle speed at the time of the speed change operation and the speed change ratio of a speed change stage after the downshift (step S12). Then, the ECU 51 calculates the difference Ra (=Ra1) between the target engine speed NeT1 and the actual engine speed NeJ, obtains the requested engine output PA from the difference Ra1 and the relation between the requested engine output PA and the difference Ra (see FIG. 4), and outputs the requested engine output PA (step S13).

Next, the ECU 51 determines whether the actual engine speed NeJ has reached a predetermined engine speed NeS (=Engine Speed NeB After Speed Change Operation−Predetermined Value β) (step S14). Incidentally, this predetermined value β is determined on the basis of the engine speed NeB after the speed change operation, and is set within the ECU 51 in advance.

When the actual engine speed NeJ has not reached Engine Speed NeB After Speed Change Operation−Predetermined Value β (NO in step S14), step S14 is performed again.

When the actual engine speed NeJ has reached Engine Speed NeB After Speed Change Operation−Predetermined Value β (YES in step S14), step S15 is performed next. In step S14 described above, the actual engine speed NeJ reaches Engine Speed NeB After Speed Change Operation−Predetermined Value β in the range of the time period A depicted in FIG. 3.

In the above-described time period A, the difference Ra between the target engine speed NeT1 and the actual engine speed NeJ is calculated, and the requested engine output PA is obtained. It is therefore possible to bring the actual engine speed NeJ close to the target engine speed NeT1 quickly, and thus possible to shorten a time taken to reach a next speed change stage. In addition, in the relation between the requested engine output PA and the difference Ra (see FIG. 4), when the actual engine speed NeJ is higher than the target engine speed NeT1, that is, when the actual engine speed NeJ overshoots, the requested engine output PA becomes a negative value. The engine output control device 55 therefore acts in a direction of decreasing the actual engine speed NeJ. Thereby an excessive overshoot can be prevented.

Returning to FIG. 8, in step S15, the ECU 51 sets the target engine speed NeT (=NeT2) from the vehicle speed at the time of the speed change operation and the speed change ratio of the speed change stage after the downshift.

Then, the ECU 51 calculates a difference Ra2 between the target engine speed NeT2 and the actual engine speed NeJ. In addition, the ECU 51 obtains the requested engine output PA from the difference Ra2 and the relation between the requested engine output PA and the difference Ra (see FIG. 4). The ECU 51 then obtains (1) the requested engine output PA and (2) the rider requested engine output PB obtained from the relation between the throttle grip angle θth and the actual engine speed NeJ (see FIG. 5) (step S16).

Next, the ECU 51 determines whether the rider requested engine output PB is smaller than the requested engine output PA (step S17).

When the rider requested engine output PB is larger than or equal to the requested engine output PA (PB≥PA (NO in step S17)), the ECU 51 outputs the requested engine output PA (step S18).

When the rider requested engine output PB is smaller than the requested engine output PA (PB<PA (YES in step S17)), the ECU 51 outputs the rider requested engine output PB (step S19).

When the smaller of the requested engine output PA and the rider requested engine output PB is thus output as engine output, the vehicle body is prevented from accelerating more than requested by the rider at a point in time that the speed change is completed and that the vehicle body is set in an accelerating state. It is thereby possible to alleviate a feeling of strangeness at the time of the speed change operation, and suppress an excessive overshoot of the engine speed.

Further, the ECU 51 calculates a rate of change of the engine speed NeB after the speed change operation, and determines whether relative rotation between the dowel 62b and the dowel hole 61b is ceased on the basis of whether the engine speed NeB after the speed change operation has decreased sharply (step S20).

When the relative rotation between the dowel 62b and the dowel hole 61b is not ceased (NO in step S20), step S20 is performed again.

When the relative rotation between the dowel 62b and the dowel hole 61b is ceased (YES in step S20), next step S21 is performed. A point in time that the relative rotation between the dowel 62b and the dowel hole 61b is ceased in the above-described step S20 is a final time t6 of the time period B depicted in FIG. 3.

When the relative rotation between the dowel 62b and the dowel hole 61b is ceased, torque transmission between the pair of speed change gears 61 and 62 becomes possible, and thus the vehicle can be accelerated.

If the actual engine speed NeJ exceeds the target engine speed NeT (=NeT2) (the actual engine speed NeJ overshoots), a great shock occurs in an accelerating direction at a point in time that the relative rotation between the dowel 62b and the dowel hole 61b is ceased. The following processing is performed to alleviate such a great shock.

In addition, in the above-described time period B, as in the time period A, the difference Ra between the target engine speed NeT2 and the actual engine speed NeJ is calculated, and the requested engine output PA is obtained. Thus, the actual engine speed NeJ can be brought close to the target engine speed NeT2 quickly. It is thereby possible to shorten the time taken to reach the next speed change stage. In addition, the requested engine output PA and the rider requested engine output PB are compared with each other, and the smaller of the requested engine output PA and the rider requested engine output PB is output. Thus, when the rider does not desire a sharp acceleration, the engine output can be reduced. As a result, it is possible to alleviate a feeling of strangeness at the time of the speed change operation by preventing the vehicle body from accelerating more than requested by the rider, and possible to suppress an excessive overshoot of the engine speed.

Returning to FIG. 8, the ECU 51 in step S21 calculates the engine speed overshoot amount Ned by subtracting the engine speed NeB after the speed change operation from the actual engine speed NeJ.

Next, the subtractive engine output calculating means 54 calculates the subtractive engine output PC on the basis of the engine speed overshoot amount Ned from the relation between the subtractive engine output PC and the engine speed overshoot amount Ned (see FIG. 6) (step S22). The ECU 51 then outputs an engine output (PB−PC) obtained by subtracting the subtractive engine output PC from the rider requested engine output PB (step S23), and further makes the engine output (PB−PC) make a gradual transition to the rider requested engine output PB (step S24). A point in time that the above-described engine output (PB−PC) becomes the same as the rider requested engine output PB is a final time t8 of the time period C depicted in FIG. 3.

In the above-described time period C, the larger the engine speed overshoot amount Ned, the larger the subtractive engine output PC. The effect of an overshoot can therefore be suppressed quickly.

As described above, the subtractive engine output PC is calculated by the subtractive engine output calculating means 54, and the subtractive engine output PC is subtracted from the rider requested engine output PB. This makes it possible to cancel an excessive torque occurring in timing in which the dowel and the dowel hole collide with each other on an acceleration side, while taking the rider requested engine output PB into consideration, and thus adjust the engine output so as to be able to realize a smooth acceleration after a shift change.

The foregoing embodiment is merely illustrative of one mode of the present invention, and can be modified and applied arbitrarily without departing from the spirit of the present invention.

DESCRIPTION OF REFERENCE SYMBOLS

27 Throttle grip (engine output adjusting means)
33 Engine
33a Crankshaft
37 Transmission
54 Subtractive engine output calculating means
55 Engine output control device
61, 62 Speed change gear
61b Dowel hole (meshed portion)
62b Dowel (meshing portion)
NeB Engine speed (engine speed after speed change operation)
NeD Engine speed overshoot amount
NeJ Actual engine speed
NeS Predetermined engine speed
NeT, NeT1, NeT2 Target engine speed
PA Requested engine output
PB Rider requested engine output
PC Subtractive engine output
PT Target engine output
SE3 Crankshaft sensor (engine speed detecting means)
β Predetermined value

The invention claimed is:

1. An engine output control device for controlling engine output at a time of a downshift speed change of a transmission, the engine output control device comprising:
 a crankshaft sensor for detecting an actual engine speed of a crankshaft; and
 a throttle grip capable of adjusting the engine output according to an operation of a rider;
 wherein the smaller of a requested engine output calculated on a basis of the actual engine speed and a rider requested engine output adjusted by the throttle grip is output as the engine output, and
 wherein the engine output control device has a meshing portion formed in a projecting manner at one of a pair of speed change gears included in the transmission, is provided with a meshed portion into which the meshing portion is inserted at the other of the pair of speed change gears, and outputs the smaller of the requested engine output and the rider requested engine output as the engine output until relative rotation between the meshing portion and the meshed portion in a state of the meshing portion being inserted in the meshed portion is ceased in a power transmitting direction between the pair of speed change gears.

2. An engine output control device for controlling engine output at a time of a downshift speed change of a transmission, the engine output control device comprising:
 a crankshaft sensor for detecting an actual engine speed of a crankshaft; and
 a throttle grip capable of adjusting the engine output according to an operation of a rider;
 wherein the smaller of a requested engine output calculated on a basis of the actual engine speed and a rider requested engine output adjusted by the throttle grip is output as the engine output, and wherein the engine output control device calculates an engine speed after speed change operation from a vehicle speed at the time of the speed change operation and a speed change ratio of a speed change stage after a downshift, wherein the engine output control device is further configured to calculate a subtractive engine output to be subtracted from the rider requested engine output when the actual engine speed overshoots the engine speed after speed change operation after the relative rotation between the meshing portion and the meshed portion is ceased and the speed change is completed, and wherein the subtractive engine output is obtained from an overshoot amount of the actual engine speed.

3. An engine output control device for controlling engine output at a time of a downshift speed change of a transmission, the engine output control device comprising:

a crankshaft sensor for detecting an actual engine speed of a crankshaft; and a throttle grip capable of adjusting the engine output according to an operation of a rider;

wherein the smaller of a requested engine output calculated on a basis of the actual engine speed and a rider requested engine output adjusted by the throttle grip is output as the engine output, and wherein the engine output control device calculates an engine speed after speed change operation from a vehicle speed at the time of the speed change operation and a speed change ratio of a speed change stage after a downshift, and outputs the requested engine output until the actual engine speed reaches a predetermined engine speed determined on a basis of the engine speed after speed change operation.

4. An engine output control device for controlling engine output at a time of a downshift speed change of a transmission, the engine output control device comprising:

a crankshaft sensor for detecting an actual engine speed of a crankshaft; and a throttle grip capable of adjusting the engine output according to an operation of a rider;

wherein the smaller of a requested engine output calculated on a basis of the actual engine speed and a rider requested engine output adjusted by the throttle grip is output as the engine output, and wherein the engine output control device calculates a target engine speed from a vehicle speed at the time of the speed change operation and a speed change ratio of a speed change stage after a downshift, determines the requested engine output according to a difference between the target engine speed and the actual engine speed, and outputs the determined requested engine output.

5. The engine output control device according to claim 1, wherein the engine output control device calculates an engine speed after speed change operation from a vehicle speed at the time of the speed change operation and a speed change ratio of a speed change stage after a downshift, wherein the engine output control device is further configured to calculate a subtractive engine output to be subtracted from the rider requested engine output when the actual engine speed overshoots the engine speed after speed change operation after the relative rotation between the meshing portion and the meshed portion is ceased and the speed change is completed, and wherein the subtractive engine output is obtained from an overshoot amount of the actual engine speed.

6. The engine output control device according to claim 1, wherein the engine output control device calculates an engine speed after speed change operation from a vehicle speed at the time of the speed change operation and a speed change ratio of a speed change stage after a downshift, and outputs the requested engine output until the actual engine speed reaches a predetermined engine speed determined on a basis of the engine speed after speed change operation.

7. The engine output control device according to claim 2, wherein the engine output control device calculates an engine speed after speed change operation from a vehicle speed at the time of the speed change operation and a speed change ratio of a speed change stage after a downshift, and outputs the requested engine output until the actual engine speed reaches a predetermined engine speed determined on a basis of the engine speed after speed change operation.

8. The engine output control device according to claim 1, wherein the engine output control device calculates a target engine speed from a vehicle speed at the time of the speed change operation and a speed change ratio of a speed change stage after a downshift, determines the requested engine output according to a difference between the target engine speed and the actual engine speed, and outputs the determined requested engine output.

9. The engine output control device according to claim 2, wherein the engine output control device calculates a target engine speed from a vehicle speed at the time of the speed change operation and a speed change ratio of a speed change stage after a downshift, determines the requested engine output according to a difference between the target engine speed and the actual engine speed, and outputs the determined requested engine output.

10. The engine output control device according to claim 3, wherein the engine output control device calculates a target engine speed from a vehicle speed at the time of the speed change operation and a speed change ratio of a speed change stage after a downshift, determines the requested engine output according to a difference between the target engine speed and the actual engine speed, and outputs the determined requested engine output.

* * * * *